(12) United States Patent
Izarra (10) Patent No.: US 11,039,265 B1
(45) Date of Patent: Jun. 15, 2021

(54) SPATIALIZED AUDIO ASSIGNMENT

(71) Applicant: Bose Corporation, Framingham, MA (US)

(72) Inventor: Felix Daniel Izarra, Westborough, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/713,830

(22) Filed: Dec. 13, 2019

(51) Int. Cl.
*H04R 5/02* (2006.01)
*H04S 7/00* (2006.01)
*G06F 3/01* (2006.01)
*H04R 5/033* (2006.01)
*H04R 5/04* (2006.01)
*H04S 3/00* (2006.01)
*H04R 1/10* (2006.01)

(52) U.S. Cl.
CPC .............. *H04S 7/304* (2013.01); *G06F 3/013* (2013.01); *G06F 3/017* (2013.01); *H04R 1/1083* (2013.01); *H04R 5/033* (2013.01); *H04R 5/04* (2013.01); *H04S 3/008* (2013.01); *H04S 2400/01* (2013.01)

(58) Field of Classification Search
CPC .......... H04S 7/304; G06F 3/013; G06F 3/017; H04R 1/1083; H04R 5/033
See application file for complete search history.

(56) References Cited

U.S. PATENT DOCUMENTS

| | | | |
|---|---|---|---|
| 8,190,438 B1 | 5/2012 | Nelissen | |
| 10,194,259 B1 | 1/2019 | Martin et al. | |
| 10,575,118 B2 | 2/2020 | Martin et al. | |
| 2013/0003998 A1* | 1/2013 | Kirkeby | G05B 23/0235 381/300 |
| 2015/0373477 A1 | 12/2015 | Norris et al. | |
| 2016/0320847 A1 | 11/2016 | Coleman et al. | |
| 2017/0257723 A1 | 9/2017 | Morishita et al. | |
| 2017/0318374 A1* | 11/2017 | Dolenc | H04R 1/1041 |
| 2018/0020313 A1* | 1/2018 | Morishita | H04R 5/033 |
| 2018/0302738 A1 | 10/2018 | Di Censo et al. | |
| 2019/0121522 A1* | 4/2019 | Davis | G06F 3/04817 |
| 2019/0227766 A1* | 7/2019 | Nahman | H04R 1/1091 |
| 2019/0246235 A1 | 8/2019 | Bruser et al. | |
| 2019/0320260 A1* | 10/2019 | Alders | G10L 21/0232 |

OTHER PUBLICATIONS

PCT International Search Report and Written Opinion for International Application No. PCT/US2020/062998, dated Feb. 24, 2021, 162 pages.

* cited by examiner

*Primary Examiner* — Simon King
(74) *Attorney, Agent, or Firm* — Hoffman Warnick LLC (57) ABSTRACT

Various implementations include approaches for controlling a wearable audio device. In some cases, a method includes: adjusting a primary audio output at the wearable audio device from a first audio location to a second, distinct audio location in response to detecting an ambient acoustic signal or an additional audio input signal unrelated to the primary audio output, where the first audio location includes a stereo audio output from a plurality of audio locations or spatialized audio output from a first spatially rendered audio location, and where the second audio location comprises spatialized audio output from a second, distinct spatially rendered audio location.

20 Claims, 5 Drawing Sheets

SPATIALIZED AUDIO ASSIGNMENT

TECHNICAL FIELD

This disclosure generally relates to augmented reality (AR) audio control. More particularly, the disclosure relates to wearable audio devices and related methods for enabling spatialized assignment of audio output.

BACKGROUND

Portable electronic devices, including headphones, audio eyeglasses and other wearable audio systems are becoming more commonplace. These portable electronic devices can enable immersive user experiences, for example, using audio to augment the user's perception of the surrounding world and aid in performing a number of tasks. However, these conventional systems fail to capitalize on the various benefits that augmented reality audio can provide. For example, audio playback in these conventional systems can limit a user's ability to engage with acoustic experiences in the surrounding environment. Additionally, conventional attempts to integrate multiple audio inputs can leave users overwhelmed and frustrated.

SUMMARY

All examples and features mentioned below can be combined in any technically possible way.

Various implementations include audio devices and related computer-implemented methods for controlling playback of augmented reality (AR) audio. Certain implementations include approaches for spatially assigning audio output to enhance user experiences.

In some particular aspects, a computer-implemented method of controlling a wearable audio device includes: adjusting a primary audio output at the wearable audio device from a first audio location to a second, distinct audio location in response to detecting an ambient acoustic signal or an additional audio input signal unrelated to the primary audio output, where the first audio location includes a stereo audio output from a plurality of audio locations or spatialized audio output from a first spatially rendered audio location, and where the second audio location includes spatialized audio output from a second, distinct spatially rendered audio location.

In other particular aspects, a wearable audio device includes: a speaker comprising at least one acoustic transducer; at least one microphone; and a control system coupled with the speaker and the at least one microphone, the control system configured to: adjust a primary audio output at the at least one acoustic transducer from a first audio location to a second, distinct audio location in response to detecting: a) an ambient acoustic signal with the at least one microphone, or b) an additional audio input signal unrelated to the primary audio output, where the first audio location comprises a stereo audio output from a plurality of audio locations or spatialized audio output from a first spatially rendered audio location, and where the second audio location comprises spatialized audio output from a second, distinct spatially rendered audio location.

Implementations may include one of the following features, or any combination thereof.

In some cases, the computer-implemented method further includes, while the primary audio output continues at the second audio location: enabling the ambient acoustic signal to be detected by a user of the wearable audio device, or b) outputting the audio input signal at a spatially rendered audio location distinct from the second audio location.

In certain aspects, the first audio location includes the first spatially rendered audio location, where the first spatially rendered audio location and the second spatially rendered audio location are two of a plurality of spatially rendered audio locations defined relative to a look direction of a user of the wearable audio device.

In particular implementations, the second spatially rendered audio location is peripheral or rearward relative to the look direction of the user.

In some aspects, the look direction of the user is indicated by sensor data from a sensor system, wherein the sensor system comprises at least one of: an inertial measurement unit (IMU) or a camera.

In certain cases, the ambient acoustic signal includes a voice signal from at least one of a user of the wearable audio device or a distinct user.

In particular implementations, the primary audio output includes call audio.

In some aspects, the second audio location is adjustable based upon at least one of: a gesture by a user of the wearable audio device, a look direction of the user, a detected direction of the ambient acoustic signal relative to the look direction of the user, or detected actuation of an interface button.

In certain implementations, the wearable audio device includes an open-ear audio device.

In particular cases, the wearable audio device includes one of: an over-ear audio device or an in-ear audio device, and in the case of detecting an ambient acoustic signal, the method further includes enhancing the ambient acoustic signal and playing back the enhanced ambient acoustic signal at the wearable audio device to mitigate inherent passive noise canceling by the over-ear audio device or the in-ear audio device.

In some implementations, at least one of the first audio location or the second audio location is pre-assigned based on a source of the primary audio output.

In certain cases, the wearable audio device includes a sensor system coupled with the control system, the sensor system including at least one of: an inertial measurement unit (IMU) or a camera, where the look direction of the user is indicated by sensor data from the sensor system.

In some aspects, the second spatially rendered audio location is separated from the first spatially rendered audio location by at least 45 degrees.

In particular implementations, the primary audio output includes output from a virtual coaching application.

In certain cases, the computer-implemented method further includes comparing the first spatially rendered audio location and the second spatially rendered audio location with data indicating the look direction of the user, and updating the spatially rendered audio locations in response to detecting a change in the look direction of the user.

In some aspects, the spatially rendered audio locations are calculated using a head related transfer function (HRTF).

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that spatially adjusting audio output can enable users to effectively balance primary playback with secondary (or, additional) audio playback or stimuli. In certain implementations, a primary audio output is adjusted from a first audio location (e.g., stereo playback or a first spatially rendered audio location) to a second, distinct audio location (e.g., a distinct spatially rendered audio location) in response to detecting an ambient acoustic signal or an additional audio input signal that is unrelated to the primary audio output. These implementations allow the user to selectively focus on audio sources while remaining heads up and hands free.

Various aspects of controlling AR audio functions are described in U.S. patent application Ser. No. 16/511,375 ("Multi-Application Control of Augmented Reality Audio") filed on Jul. 15, 2019; U.S. patent application Ser. No. 16/295,717 ("Systems and Methods for Controlling Electronic Devices"), filed on Mar. 7, 2019; and U.S. patent application Ser. No. 16/370,029 ("Methods and Systems for Establishing User Controls"), filed on Mar. 29, 2019, each of which is incorporated by reference in its entirety.

Commonly labeled components in the FIGURES are considered to be substantially equivalent components for the purposes of illustration, and redundant discussion of those components is omitted for clarity.

Aspects and implementations disclosed herein may be applicable to a wide variety of audio devices including personal audio devices, such as a portable speaker, headphones, and wearable audio devices in various form factors, such as watches, glasses, neck-worn speakers, helmets with integrated speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some aspects disclosed may be particularly applicable to personal (wearable) audio devices such as glasses, headphones, earphones or other head-mounted audio devices (e.g., helmets with integrated speakers).

Audio Device

Figure 1:
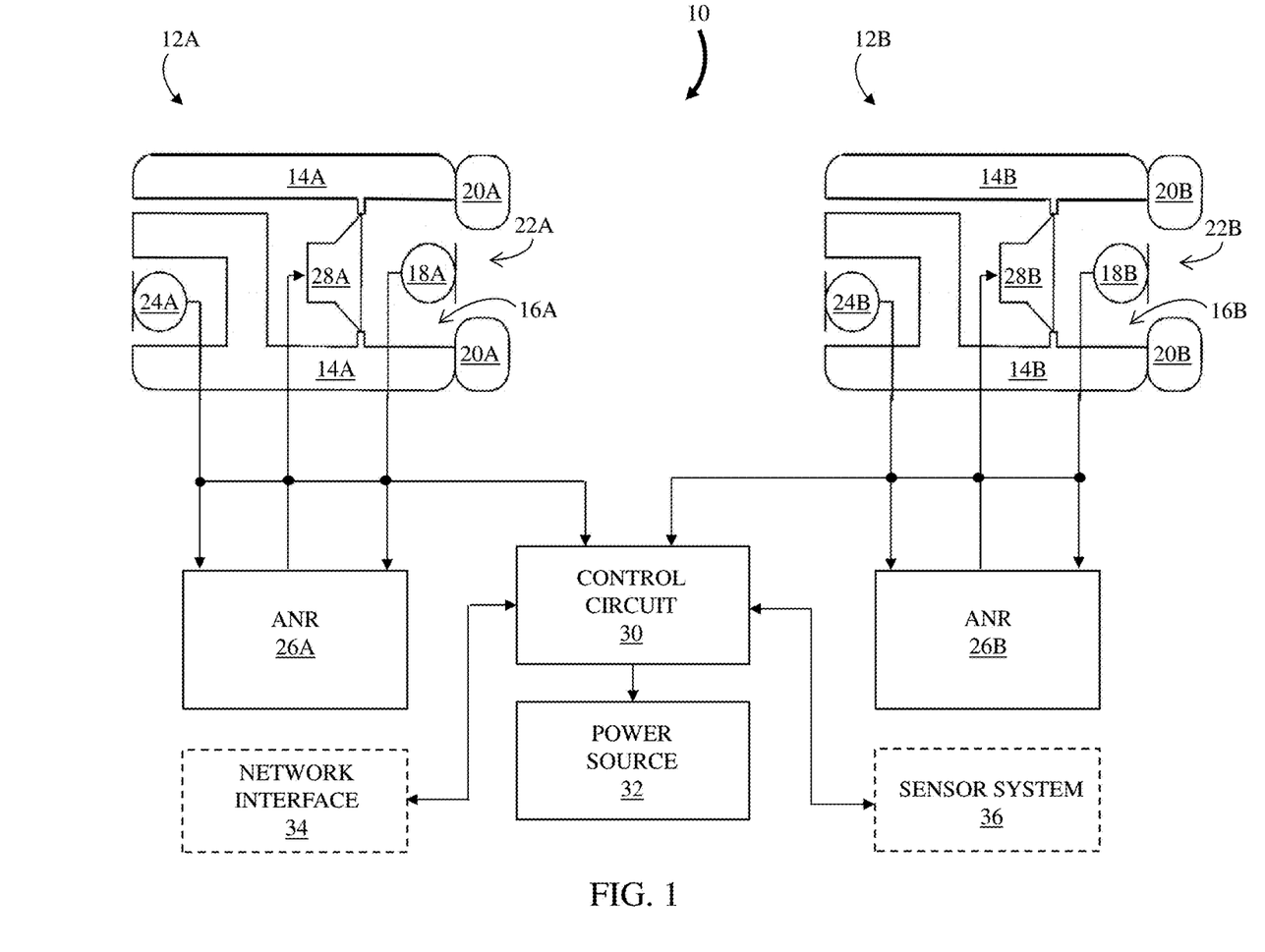
FIG. 1 is a schematic depiction of an example audio device according to various implementations.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device (or simply, audio device) 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include active noise reduction (ANR), the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. As described herein, in addition to providing an anti-noise acoustic signal, electroacoustic transducer 28 can utilize its sound-radiating surface for providing an audio output for playback.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The audio device 10 also includes a power source 32. The control circuit 30 and power source 32 may be in one or both of the earpieces 12 or may be in a separate housing in communication with the earpieces 12. The audio device 10 may also include a network interface 34 to provide communication between the audio device 10 and one or more audio sources, other networked (e.g., wireless) speaker packages and/or other audio playback devices via one or more communications protocols. Additional description of the control circuit 30 (e.g., including memory and processing function), network interface 34 (e.g., including network media processor functions) and other features of the audio device 10 can be found in U.S. patent application Ser. No. 16/179,205 ("Spatialized Virtual Personal Assistant"), filed on Nov. 2, 2018, which is herein incorporated by reference in its entirety.

As shown in FIG. 1, audio device 10 can also include a sensor system 36 coupled with control circuit 30 for detecting one or more conditions of the environment proximate audio device 10. Sensor system 36 can include inner microphones 18 and/or outer microphones 24, sensors for detecting inertial conditions at the audio device 10 and/or conditions of the environment proximate audio device 10 as described herein. The sensors may be on-board the audio device 10, or may be remote or otherwise wireless (or hard-wired) connected to the audio device 10. As described further herein, sensor system 36 can include a plurality of distinct sensor types for detecting inertial information, environmental information, or commands at the audio device 10. In particular implementations, sensor system 36 can enable detection of user movement, including movement of a user's head or other body part(s), and/or the look direction of a user. In particular, portions of sensor system 36 may incorporate one or more movement sensors, such as accelerometers gyroscopes and/or magnetometers. In some particular implementations, sensor system 36 can include one or more inertial measurement units (IMUs) having three-dimensional (3D) accelerometers, gyroscopes and a magnetometer.

In various implementations, the sensor system 36 can be located at the audio device 10, e.g., where an IMU is physically housed in the audio device 10. In some examples, the sensor system 36 (e.g., including the IMU) is configured to detect a position, or a change in position, of the audio device 10. This inertial information can be used to control various functions described herein. For example, the inertial information can be used to trigger a command function, such as activating an operating mode of the audio device 10 (e.g., AR audio mode), modifying playback of an audio file, or adjusting a setting on the audio device 10, etc. The sensor system 36 can also include one or more interface(s) for receiving commands at the audio device 10, e.g., permitting a user to initiate functions of the audio device 10. In a particular example implementation, the sensor system 36 can include, or be coupled with, a capacitive touch interface for receiving tactile commands on the audio device 10. In other implementations, as illustrated in the phantom depiction in FIG. 1, one or more portions of the sensor system 36 can be located at another device capable of indicating inertial, location, or other information about the user of the audio device 10.

Data Flow

Figure 2:
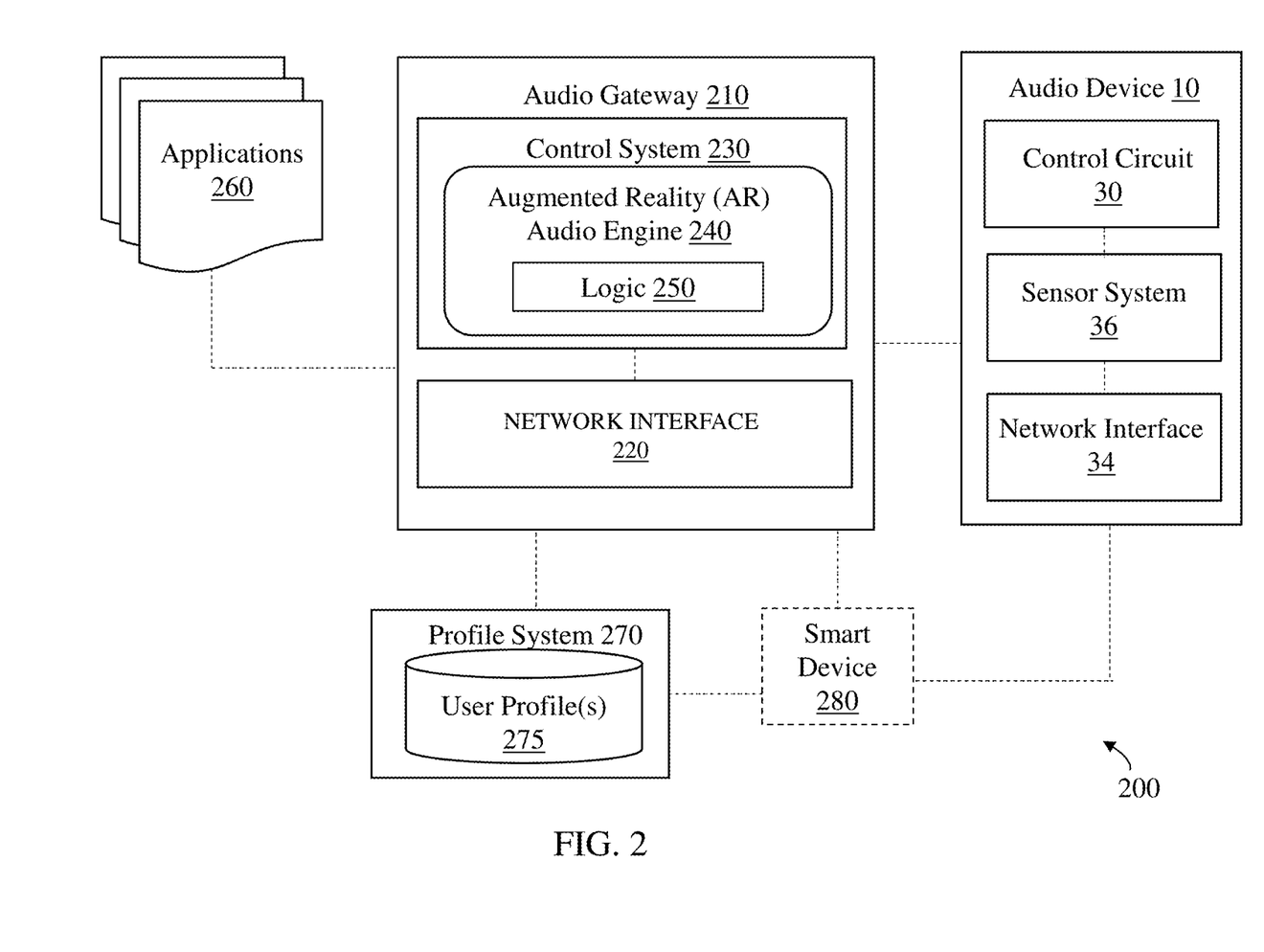
FIG. 2 is data flow diagram illustrating interaction between devices running an augmented reality audio engine in an environment according to various implementations.

As described with respect to FIG. 1, control circuit 30 can execute (and in some cases store) instructions for controlling AR audio functions in audio device 10 and/or other audio playback devices in a network of such devices. FIG. 2 shows a schematic depiction of data flows in a system 200 including the audio device 10 connected with an audio gateway device (audio gateway) 210. The audio device 10 and audio gateway 210 can be paired according to any connection described herein, e.g., a wireless connection such as Bluetooth, WiFi or Zigbee. Example configurations of an audio gateway 210 can include a cellular phone, personal data assistant (PDA), tablet, personal computer (PC), wearable communication system, or any other known audio gateway for providing audio content to audio device 10. In particular implementations, the audio gateway 210 includes a network interface 220, which can include, e.g., a wireless transceiver configured to communicate over any wireless protocol described herein.

Audio gateway 210 can further include a control system 230 configured to execute control functions in a spatialized AR audio mode at the audio device 10. The control system 230 can include a microprocessor, memory, and other conventional control hardware/software for executing functions described herein. In some cases, control system 230 can include similar components as those described with respect to control circuit 30 in FIG. 1. In various implementations, control system 230 can have additional processing and/or storage capabilities not present at the control circuit 30 in audio device 10. However, in various implementations, actions performed by control system 230 can be executed at the control circuit 30 on audio device 10 to provide augmented reality (AR) audio functions described herein. In particular implementations, control system 230 includes an augmented reality (AR) audio engine 240 or otherwise accesses program code for executing processes performed by AR audio engine 240 (e.g., via network interface 220). AR audio engine 240 can include logic 250 for executing functions described herein. Both audio gateway 210 and audio device 10 are shown in simplified form in FIG. 2 to focus illustration on functions described according to the AR audio engine 240.

In various particular implementations, AR audio engine 240 is configured to coordinate audio outputs at the transducer (e.g., speaker) 28 (FIG. 1) of the audio device 10 to provide distinct audio outputs at distinct audio locations based on characteristics of the audio inputs and/or ambient acoustic signals. In some cases, the AR audio engine 240 coordinates distinct spatialized audio outputs corresponding with spatially delineated zones defined relative to the physical position of the audio device 10. For example, a primary audio output is provided in a first spatially delineated zone while a second audio output (from a distinct audio input) is provided in a second spatially delineated zone. In other cases, the AR audio engine 240 enables ambient acoustic signals to be detected by the user while the primary audio output is provided, e.g., in stereo or in a spatially delineated zone. The logic 250 in AR audio engine 240 can include a set of rules for defining the spatialized audio outputs in both absolute and relative terms.

FIG. 2 illustrates data flows between components in system 200 (e.g., audio device 10 and audio gateway 210), as well as between those components and additional devices. It is understood that one or more components shown in the data flow diagram may be integrated in the same physical housing, e.g., in the housing of audio device 10, or may reside in one or more separate physical locations. In various implementations, the AR audio engine 240 is connected (e.g., via the audio gateway 210) with a set of applications 260, which may run locally at a given device (e.g., audio device 10 and/or smart device 280), or may be running in a cloud-based system (server) connected with that device. The AR audio engine 240 is also connected with a profile system 270 including user profiles 275. In additional implementations, the AR audio engine 240 can also be connected with a smart device 280.

In various implementations, the AR audio engine 240 runs as a control application at the audio device 10, audio gateway 210 and/or smart device 280 for functions from a set of distinct (software) applications 260. In still further implementations, the AR audio engine 240 runs as a control application at a cloud-based or other distributed computing system (server), such as in the case that the software applications 260 are run at the same or a similar system. Additional details of application-based spatialized audio functions are described in U.S. patent application Ser. No. 16/570,238 (Spatialized Augmented Reality (AR) Audio Menu, filed on Sep. 13, 2019), which is incorporated by reference herein in its entirety.

In particular implementations, the logic 250 in AR audio engine 240 is configured to process sensor data, contextual data, and/or user input data from the audio device 10 and/or additional sources (e.g., smart device 280, profile system 270, etc.) and execute various control functions. For example, the AR audio engine 240 is configured to receive sensor data from the sensor system 36, data from one or more applications running at the audio gateway 210 and/or the smart device 280 and/or user profile data (e.g., from profile system 270). In various implementations, the AR audio engine 240 is also configured to receive selection commands from a user from the AR menu (e.g., via gesture-based commands), and execute functions associated with the selection command(s).

AR audio engine 240 (including logic 250, related software and/or hardware) can be located at the audio device 10, audio gateway 210 or any other device described herein (e.g., smart device 280), and can execute functions at one or more devices and/or components described herein. In some cases, the AR audio engine 240 is an entirely hardware implementation, an entirely software implementation (including firmware, resident software, micro-code, etc.) or an implementation combining software and hardware aspects that may all generally be referred to herein as an "engine." Additionally, the AR audio engine 240 can take the form of a computer program product embodied in any tangible medium of expression having computer-usable program code embodied in the medium. In various particular implementations, the AR audio engine 240 executes functions described herein according to logic 250, which can be stored or otherwise accessed by any device capable of performing those functions, e.g., audio gateway 210, audio device 10 or other device(s) described herein.

User profiles 275 may be user-specific, community-specific, device-specific, location-specific or otherwise associated with a particular entity such as the user. User profiles 275 can include user-specific spatialized audio settings, or audio content available from network audio sources coupled with network interfaces 34 and/or 220. In some cases, profile system 270 is located in a local server, or a cloud-based server, similar to any such server described herein. Profile system 270 can be associated with any community of users, e.g., employees in a workplace, a social network, subscription-based music service, etc.

In addition to the profile system 270, the AR audio engine 240 can additionally be coupled (e.g., wirelessly and/or via hardwired connections in personal audio device 10) with an audio library (not shown), which can include audio content (e.g., audio file(s), playlist(s) of audio files, podcast(s), an audio stream or an Internet radio station, location-specific audio pins, condition-specific audio files and/or streams, or one or more audibly presented selections) for playback (e.g., streaming or otherwise rendering) at audio device 10.

As shown herein, AR audio engine 240 can also be coupled with a separate smart device 280. The smart device 280 is shown in phantom because it may be a separate component from the device executing the AR audio engine 240, however, it is understood that in various implementations, the audio gateway 210 is located at the smart device 280. The AR audio engine 240 can have access to a user profile (e.g., profile 275) and/or biometric information about the user of audio device 10. In some cases, the AR audio engine 240 directly accesses the user profile and biometric information, however, in other cases, the AR audio engine 240 can access the user profile and/or biometric information via a separate smart device 280. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with a user, and can include one or more network interfaces for interacting with control circuit 30 and/or control system 230 and other components in audio device 10. Additional capabilities of the smart device 280 are described in U.S. patent application Ser. No. 16/511,375, previously incorporated by reference herein.

The AR audio engine 240 is configured to receive sensor data about one or more activity states of the audio device 10 from sensor system 36. In various particular implementations, the sensor system 36 can include an IMU for providing inertial information about the audio device 10 to the AR audio engine 240. In various implementations, this inertial information can include orientation, translation and heading. For example, inertial information can include changes in heading (e.g., from an absolute value relative to magnetic north), changes in orientation (e.g., roll, pitch, yaw), and absolute translation (e.g., changes in x-direction, y-direction, z-direction). Additionally, inertial information can include first and second derivatives (i.e., velocity and acceleration) of these parameters. In particular examples, the AR audio engine 240, including logic 250, is configured to calculate spatially rendered audio locations proximate the audio device for audio output using inputs such as audio pin angle, IMU azimuth angle and persistent azimuth, as described in U.S. Pat. No. 10,194,259 ("Directional Audio Selection"), which is hereby incorporated by reference in its entirety. In these cases, the spatially rendered audio locations can be calculated using a head related transfer function (HRTF). In additional implementations, sensor system 36 can include additional sensors for detecting conditions at the audio device 10, for example: a position tracking system; and a microphone (e.g., including one or more microphones). It is understood that any number of additional sensors can be incorporated in sensor system 36. Additional details about specific sensor types and functions, along with actuation mechanisms and cues in the audio device 10 and/or smart device 280 can be found in U.S. patent application Ser. No. 16/179,205 ("Spatialized Virtual Personal Assistant"), previously incorporated by reference herein.

In additional implementations, the AR audio engine 240 is configured to assign or re-assign spatialized audio output locations rendered by the transducer (e.g., speaker) 28 (FIG. 1) at audio device 10 in response to detecting one or more initiation triggers from audio device 10 or another connected device such as audio gateway 210 and/or smart device 280. For example, initiation triggers can include a user interface command, multi-modal gesture or sensor input detected at the audio device 10, audio gateway 210 and/or smart device 280. In additional implementations, initiation triggers include detected activity by a mobile application (e.g., software application) running on the audio device 10. Additional triggers can include proximity triggers such as proximity to a Bluetooth beacon (e.g., BLE beacon), or a GPS location trigger. In still further implementations, initiation triggers can include device functions (e.g., functions of the audio device 10 such as timer/alarm mechanisms, changes in noise cancellation settings, etc.). These triggers and mechanisms can be used in conjunction with other actuation mechanisms described herein (e.g., application data-based actuation, voice actuation, detected ambient acoustic activity actuation, gesture actuation, tactile actuation) to control spatialized audio outputs.

As additionally noted herein, the AR audio engine 240 can be configured to detect or otherwise retrieve contextual data about the user and/or usage of the audio device 10. For example, the AR audio engine 240 can be configured to retrieve contextual data from one or more applications running at the audio gateway 210 and/or the audio device 10, such as a calendar or organizational application, e-mail or messaging application, social media application, travel application, fitness application, etc. The AR audio engine 240 can also be configured to detect that the user is engaging one or more device functions, for example, that the user is on a phone call or actively sending/receiving messages with another user using the audio gateway 210.

As described herein, in some implementations, the AR audio engine 240 is configured to control multiple audio outputs (e.g., two or more audio outputs) in spatialized form. In some cases, each audio output is rendered from a spatialized audio file configured for playback (which in some cases is binaural). In these cases, the spatialized audio file is configured for output at a spatially rendered audio location, or multiple spatially rendered audio locations, relative to the user. For example, the spatialized audio file can be configured for playback at one or more spatially rendered audio locations relative to the user's look direction (e.g., as detected by sensors at sensor system 36 and/or smart device 280), or relative to a physical location proximate the user. In other cases, the audio output is rendered from a monaural audio file, a stereo audio file, a spatialized audio file or a multichannel audio file. In additional cases, the audio output is rendered from an input sources such as call audio or video (call) audio in one or more locations. Application of spatialized audio functions in particular devices is further described in U.S. Pat. No. 10,194,259, previously incorporated by reference herein. In particular cases, the audio output is provided at the audio device 10 in a spatially rendered audio location that is defined relative to a look direction of the user (e.g., the user's head direction or eye focus direction) or relative to a physical location proximate the user. In additional particular implementations, the AR audio engine 240 outputs the audio according to an application setting, a location of the audio device 10, the look direction of the user, contextual information about what a user is doing, and/or a type of the playback condition data.

As noted herein, in various implementations, rules for adjusting a primary audio output in terms of audio location(s) can be settings-specific, location-specific, device-specific, time-specific, weather-specific, movement-specific, event-specific, specifically tailored to interaction with other users, or otherwise tailored to particular user experiences.

Example Process Flow

Figure 3:
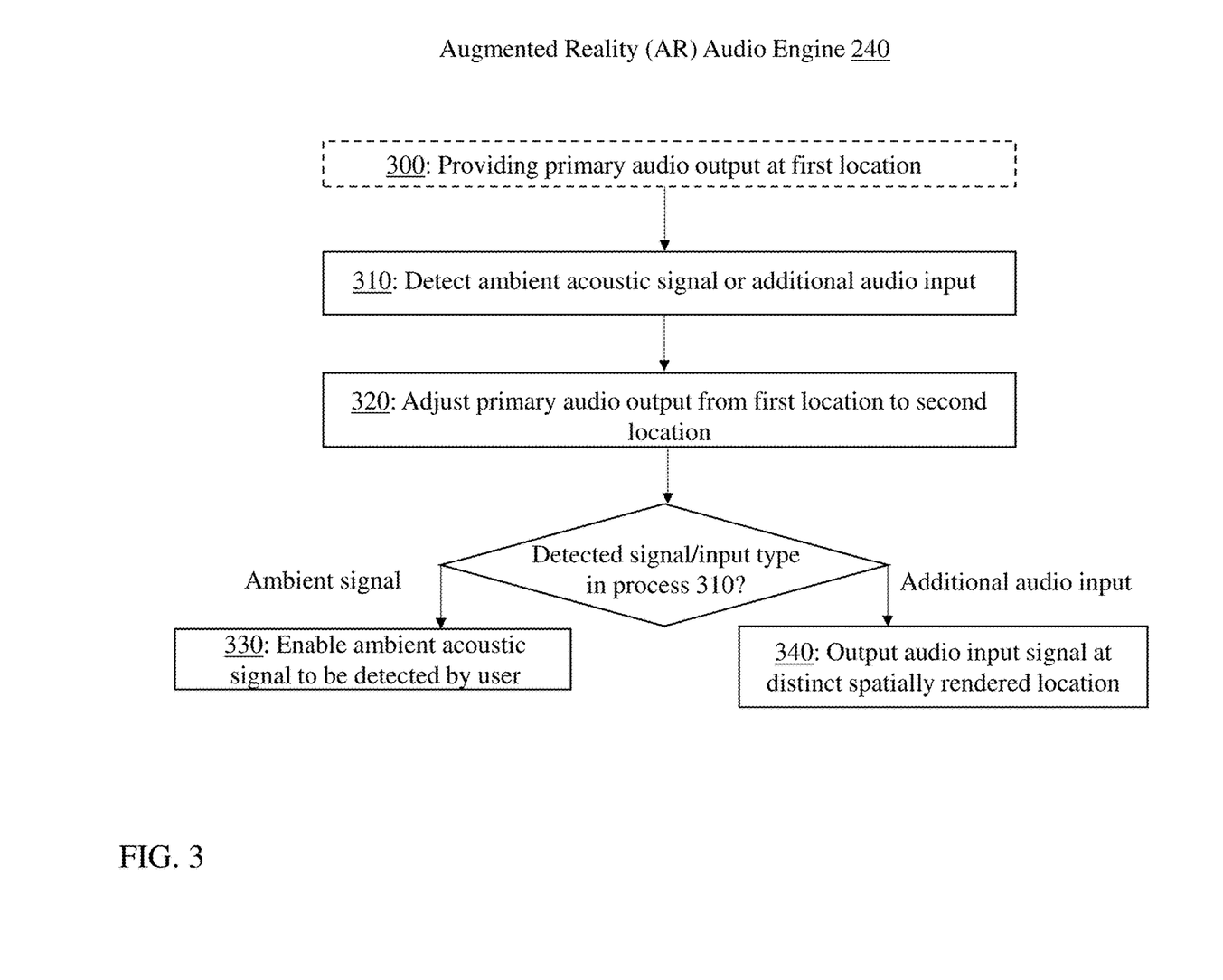
FIG. 3 is a flow diagram illustrating processes performed by the augmented reality audio engine shown in FIG. 2.

During operation, the AR audio engine 240 is configured to control playback of AR audio at the audio device 10 according to various triggers (or, rules). In particular implementations, the AR audio engine 240 is configured to adjust a primary audio output and in some cases control a secondary audio output at the audio device 10 based upon one or more initiation triggers. FIG. 3 illustrates a general process flow in controlling audio output(s) as performed by the AR audio engine 240. FIGS. 2 and 3 are referred to concurrently.

As shown, a preliminary process 300 includes providing a primary audio output at the audio device 10 (e.g., at transducers 28, FIG. 1) at a first audio location. The "primary" audio output is designated as the audio output at the audio device 10 that occurs earlier in time than the additional (or, secondary) audio output. As described herein, the primary audio output can include stereo audio output from a plurality of audio locations, or spatialized audio output from a first spatially rendered audio location (e.g., a spatially delineated zone defined relative to the user's look direction). In certain implementations, the primary audio output includes call audio, such as phone call audio. In these implementations, the primary audio output (call audio) can include stereo audio output, or spatialized audio output from a first spatially rendered audio location.

In particular examples, the primary audio output is always designated as stereo audio output, regardless of the source of the primary audio output (i.e., regardless of the input audio source). In other examples, the primary audio output is always designated as spatialized audio output from a first spatially rendered audio location, regardless of the source of the primary audio output. In still other implementations, the primary audio output is designated as either stereo audio output or spatialized audio output based on the input audio source (e.g., based on the type of audio such as call audio, music playback, audio from video playback, etc.). In certain cases, a user can define settings in the AR audio engine 240 (and/or in user profile(s) 275), FIG. 1) to control which types of primary audio is output as stereo audio or in a spatially rendered location. The AR audio engine 240 is configured to check playback settings to determine whether primary audio input is assigned to stereo playback or spatialized playback. In certain example implementations, the primary audio output is designated as stereo audio output in default settings, and can be adjusted, for example, by a user settings adjustment.

Returning to FIG. 3, in process 310, the AR audio engine 240 detects an ambient acoustic signal or an additional audio input signal that is unrelated to the primary audio output. In certain implementations, the AR audio engine 240 detects the ambient acoustic signal using one or more sensors (e.g., microphone(s)) in the sensor system 36 or located in another device communicating with the AR audio engine 240. In various implementations, the AR audio engine 240 is configured to compare the detected ambient acoustic signal with a known acoustic signature (or known acoustic signature types) to characterize that detected ambient acoustic signal. In certain implementations, the AR audio engine 240 is configured to identify particular ambient acoustic signals such as voice signals (e.g., one or more users that are speaking) and alarms (e.g., sirens or automobile horns). In certain implementations, the AR audio engine 240 is configured to detect ambient acoustic signals that include a voice signal from the user of the audio device 10 or a voice signal from a distinct user.

In still other implementations, the AR audio engine 240 detects an additional audio input signal that is unrelated to the primary audio output. For example, the additional audio input signal can include an audio notification, music playback, call audio, etc. In certain examples, the primary audio output is call audio, and the additional audio input signal is an input signal from an application providing an audio notification or other reminder (e.g., an audio notification about an upcoming event, a received message, a weather or travel alert, etc.). In other examples, the primary audio output is music playback, and the additional audio input signal is call audio or an audio notification or reminder input signal. In still other implementations, the primary audio output is from a virtual coaching application, such as a fitness coaching application. In these example cases, the additional audio input signal can include call audio, an audio notification, or music playback.

In process 320, in response to detecting the ambient acoustic signal or the additional audio input signal (unrelated to the primary audio output), the AR audio engine 240 adjusts the primary audio output from a first audio location to a second, distinct audio location. While the first audio location can include stereo audio output from a plurality of locations, the second audio location is a spatially rendered audio location. Spatially rendering the primary audio output can enable to the user to effectively focus on one of the audio outputs at a time while maintaining the primary audio output.

In certain cases, process 320 includes one or more sub-processes, including detecting an initiation trigger for adjusting the location of the primary audio output. For example, the AR audio engine 240 is configured to detect an initiation trigger for initiating spatialized playback of the primary audio output. As noted herein, initiating triggers can take any of a number of forms, including user interface commands, multi-modal gestures, sensor inputs, detected activity by an application 260 running on the audio device 10, etc.

In particular cases, process 320 includes detecting the ambient acoustic signal or the additional audio input signal and prompting the user to enable adjustment of the primary audio output, e.g., with an audio prompt, or haptic prompt such as a vibration. In certain cases, the initiation trigger for adjusting the spatialized audio location of the primary audio output includes a user response to the prompt from the AR audio engine, e.g., a user command including a tactile actuation (e.g., double tap on a capacitive touch or other touch interface, tap-and-hold command on the touch interface, tap-and-turn gesture using a touch interface and gesture-based trigger, etc.) or a voice command (e.g., "Bose, please enable spatialized audio adjustment") that is detected at the audio device 10 or another device (e.g., audio gateway 210 or smart device 280). The prompt can take the form of any user interface prompt, e.g., an audio prompt, a user interface (e.g., visual) prompt, a tactile (e.g., vibrational) prompt, etc. In particular examples, the AR audio engine 240 provides an audio prompt to enable adjustment of the primary audio output, where that audio prompt is rendered at a spatially delineated zone distinct from the primary audio output (e.g., in a specific zone in the case that the primary audio output is stereo output or in a distinct zone in the case that the primary audio output is in a spatially delineated zone).

In some cases, the initiation trigger is an affirmative response to the prompt, e.g., within a response period such as a matter of seconds. In some cases, the affirmative response can include a nod or other gesture (e.g., multi-modal gesture), a response to a user interface prompt such as selecting a "Yes" or "Adjust audio" button on an interface at one of the devices in system 200, or a voice response from the user such as "Yes" or "Adjust audio".

In additional cases, the AR audio engine 240 automatically adjusts the first audio output to the second audio location (e.g., spatialized audio location) based on settings in the AR audio engine 240 (and/or in user profile(s) 275), FIG. 1). These settings can be default settings for the AR audio engine 240 and/or user-defined settings based on types of audio input sources, current user location, time of day, etc.

In any case, in response to detecting the ambient acoustic signal or the additional audio input signal (unrelated to the primary audio output), the AR audio engine 240 is configured to adjust the audio location of the primary audio output. In certain cases, the AR audio engine 240 is configured to provide audio output in two or more audio locations (or, spatially delineated zones) rendered relative to the user. In some cases, these audio locations are pre-assigned based on the source of the primary audio output (e.g., call audio, music playback, etc.). In other cases, the AR audio engine 240 assigns the audio locations as additional audio inputs (or ambient acoustic signals) are detected.

In some cases, playback of one or more audio outputs can be provided to the user in a band-limited playback format. That is, the audio output associated with each zone can be provided (e.g., at transducer(s)) in a band-limited playback. In various implementations, the band-limited playback includes spatially rendered playback of monaural sources. This spatially rendered playback of monaural sources can take multiple forms. For example, the sources of audio playback can be presented as monaural playback to the user, but in practice, the AR audio engine 240 can provide a stereo mix of multiple mono sources to place the playback in physical space around the user. In other cases, AR audio engine 240 provides monaural playback of each source, e.g., to reduce latency. As described further herein, one or more of the outputs can be differentiated from playback of other sources of audio content (e.g., music, podcast, navigation directions).

Figure 4:
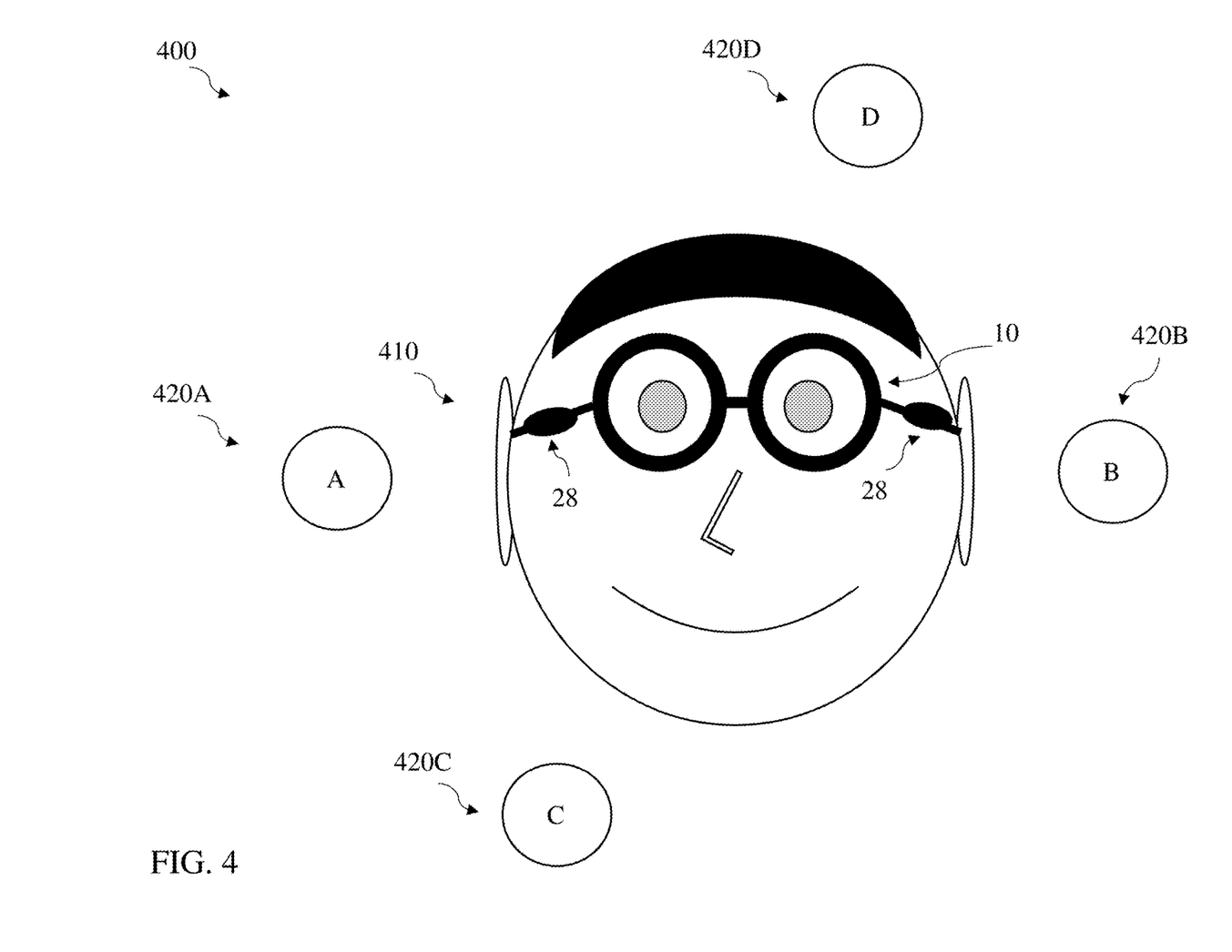
FIG. 4 shows an example schematic depiction of a user engaging spatialized audio functions according to various implementations.
Figure 5:
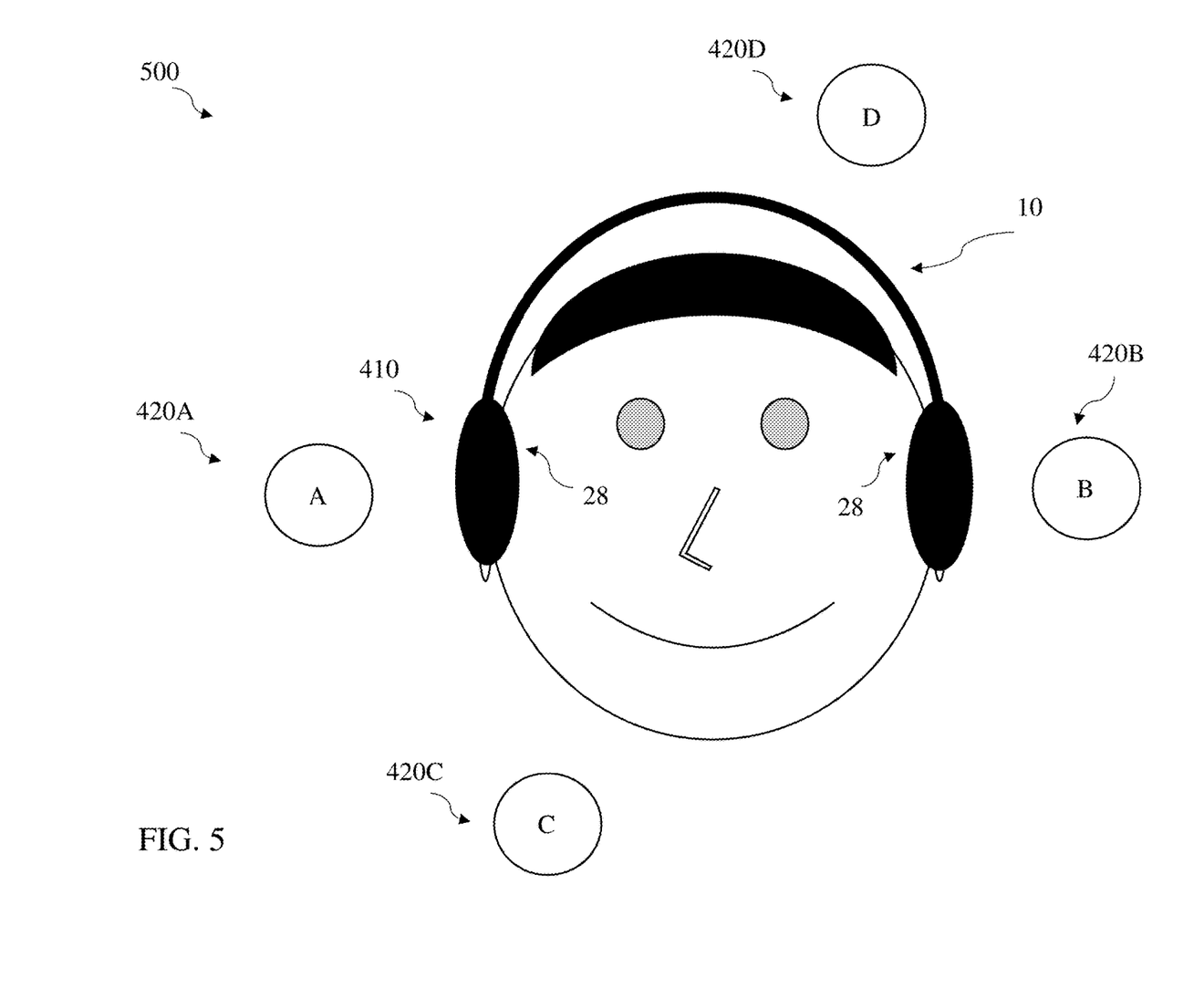
FIG. 5 shows an additional example schematic depiction of a user engaging spatialized audio functions according to various implementations.

FIG. 4 shows an example environment 400, illustrating a user 410 wearing an audio device 10 (e.g., an open-ear audio device such as audio eyeglasses), and a depiction of audio playback in distinct spatially delineated locations (or, zones) 420. FIG. 5 shows an example environment 500, illustrating the user 410 wearing another audio device 10 (e.g., an over-ear audio device or an in-ear audio device such as headphones or earphones). FIGS. 4 and 5 are referred to simultaneously. The zones 420 are defined relative to the physical position of the audio device 10, e.g., relative to the look direction of user 410 while wearing the audio device 10. Each audio output can be assigned to a location (e.g., a zone 420) relative to the user 410. In particular implementations, the AR audio engine 240 is configured to simultaneously provide at least two distinct audio outputs in distinct zones 420. In certain cases, the AR audio engine 240 is configured to provide audio outputs in one or more of a plurality of zones, e.g., three, four or more spatially delineated locations (zones) 420. The example depicted in FIG. 4 shows four spatially delineated zones 420. In various implementations, one or more of the primary (and in some cases, secondary) audio output(s) are rendered in locations (or zones) 420 as an audio file or audio stream.

With continuing reference to FIG. 4 and FIG. 5, example locations are illustrated as distinct zones denoted by A, B, C, D, etc.), where 420A denotes a zone to the user's front right or peripheral right, 420B denotes a zone to the user's front left or peripheral left, 420C denotes a forward zone relative to the user 410, and 420D denotes a rearward zone relative to the user 410. In certain examples, the zones 420A, 420B, 420C, 420D, etc. can be dedicated to a default audio output type, source of the audio output, or sub-category of audio output (e.g., type of music playback or type of call audio such as conference call audio versus call audio from a particular contact). In certain implementations, neighboring spatially delineated zones are separated from one another by approximately at least 45 degrees of rotation laterally, or approximately at least 45 degrees vertically. In particular cases, neighboring spatially delineated zones are separated from one another by approximately 90 degrees, and in certain cases, are separated from one another by up to approximately 180 degrees. In some cases, only two zones (e.g., 420A and 420B, 420D and 420C, 420A and 420D, etc.) are used for audio output at a given time. In various implementations, as described herein, the AR audio engine 240 is configured to adjust the primary audio output from a first audio location to a second, distinct audio location (process 320, FIG. 3). With reference to FIGS. 4 and 5, this process can include adjusting the primary audio output from a stereo audio output to one of the locations (zones) 420A-D, or from one of the locations (e.g., 420A or 420C) to another location (e.g., 420B or 420D).

Returning to FIG. 3, after adjusting the primary audio output to the second audio location (e.g., from stereo playback to one of the locations 420A-D in FIGS. 4 and 5, or between locations 420A-D), or approximately contemporaneously with process 320, the AR audio engine 240 is configured to perform at least one additional process, based on the detected signal or audio input from process 310. That is, in the case that the ambient acoustic signal is detected in process 310, the AR audio engine 240 is configured to enable the ambient acoustic signal to be detected by the user (process 330). In cases where the wearable audio device is an open-ear audio device that does not directly obstruct the user's ear opening (e.g., as illustrated in FIG. 4), and the ambient acoustic signal is detected in process 310, adjusting the primary audio output from the first location to the second location will enhance the user's ability to hear the ambient acoustic signal.

In certain other implementations where the audio device 10 includes an over-ear audio device or an in-ear audio device (illustrated in FIG. 5) and the ambient acoustic signal is detected in process 310, the AR audio engine 240 enhances the ambient acoustic signal and plays back the enhanced ambient acoustic signal at the audio device 10 to mitigate inherent passive noise canceling by the over-ear audio device or the in-ear audio device. In various implementations, the AR audio engine 240 detects the device type of the audio device 10 (e.g., by device ID or other device indicator) and where the detected device type indicates that the audio device 10 is an over-ear or in-ear audio device, the AR audio engine 240 enhances the ambient acoustic signal and plays back the enhanced acoustic signal at the transducers 28 (FIG. 1). In some cases, this enhanced playback is referred to as "aware" mode playback or "playthrough."

In additional implementations, where process 310 includes detecting an additional audio input, the AR audio engine 240 is configured (e.g., contemporaneously with process 320 or afterward) to output audio associated with that additional audio input at a distinct spatially rendered location (process 340). These processes can be performed regardless of whether the audio device 10 is an open-ear device or a closed-ear or in-ear device. In these cases, the additional audio input is output at a spatialized location that is distinct from the audio location where the primary audio output was adjusted in process 320. For example, referring to FIGS. 4 and 5, the primary audio output can be assigned to a first location 420D, while the additional audio input is assigned to a second location 420C.

Additional AR Audio Functions

With continuing reference to FIGS. 4 and 5, in certain implementations, the second audio location is adjustable based on a number of inputs or factors, including for example: a gesture by user 410 of the audio device 10, a look direction of user 410, a detected direction of the ambient acoustic signal relative to the look direction of user 410, and/or detected actuation of an interface button (e.g., at the audio device 10, audio gateway 210 and/or smart device 280). In certain cases, the AR audio engine 240 adjusts the second audio location in response to detecting a user gesture such as a head nod, head shake, hand waive, etc. The gesture(s) can be detected using any sensor in the sensor system 36 (FIG. 2), including an optical sensor and/or an IMU. In these cases, the AR audio engine 240 adjusts the second audio location in a direction aligned with the user gesture, e.g., in the direction in which she waives a hand. In other cases, the AR audio engine 240 adjusts the second audio location across a predefined selection of locations in response to each detected gesture.

In certain cases, the AR audio engine 240 adjusts the second audio location in response to detecting a change in the user's look direction, e.g., using the IMU or optical sensor(s) in sensor system 36. In these cases, the AR audio engine 240 can adjust one or both of the first audio location and second audio location based on the user's updated look direction. In these examples, the AR audio engine 240 maintains the same relative location of the audio locations to the user 410 as that user 410 moves his/her head. In other cases, the AR audio engine 240 maintains the audio locations in absolute locations while the user 410 moves his/her head, allowing the user 410 to move relative to the those locations.

In additional cases, the AR audio engine 240 adjusts the second audio location based on a detected direction of the ambient acoustic signal relative to the look direction of user 410. In these cases, the AR audio engine 240 is configured to detect the source direction of the ambient acoustic signal relative to the user's look direction (e.g., using conventional beamforming and associated DSP approaches), and adjust the second audio location to a zone that is peripheral to, or opposite to the direction of the ambient acoustic signal relative to the user's head. Using the example of FIG. 5, if the AR audio engine 240 detects the ambient acoustic signal is coming from a forward direction relative to the user's look direction (e.g., near zone 420C), the AR audio engine 240 is configured to adjust the second audio location to one of the peripheral zone 420A or 420B, or to zone 420D that is rearward relative to the user's look direction. Similarly, the AR audio engine 240 can adjust the second audio location to an opposite peripheral zone (e.g., zone 420A or 420B), or a forward or rearward zone (e.g., zone 420C or 420D) in response to detecting an ambient acoustic signal coming from a peripheral direction (e.g., the other one of zone 420A or 420B).

In further implementations, the AR audio engine 240 adjusts the second audio location based on detected actuation of an interface button (e.g., at the audio device 10, audio gateway 210 and/or smart device 280). In these cases, the user 410 can adjust the second audio location using an interface command such as a touch command on a capacitive touch interface or other interface. In some example cases, in response to a predefined interface command (e.g., a swipe on a capacitive touch interface or a press of a user interface button) while audio output is provided at the second audio location, the AR audio engine 240 is configured to adjust the second audio location, e.g., to a predefined location (e.g., zone 420A, B, C, etc.) or progressively along a series of locations in response to a series of interface commands.

In particular cases, rules for assigning the primary audio output to a location and the additional audio input to a location are defined by user preferences (e.g., settings in the AR audio engine 240 and/or user profiles 275). In particular cases, the rules for assigning the primary audio output to a location and the additional audio input to a location are defined by default settings in the AR audio engine 240 and/or user profiles 275, and are configured for updating or adjusting via any interface command described herein.

In various implementations, selection commands described herein include one or more of: a tactile actuation, gesture actuation or a voice command that is detected at the audio device 10 or another device (e.g., audio gateway 210 and/or smart device 280). In some cases, the selection command is a gesture that is detected by the gesture detection system (e.g., an IMU at the audio device 10). As noted herein, example gestures can include single-action gestures (e.g., nod, double-tap, head shake, look left/right, look up/down etc.) or multi-modal gestures (e.g., those requiring two actions to register a selection, such as a look-and-hold gesture, a hold-and-nod gesture, a look-and-tap gesture, etc.). In various implementations, the AR audio engine 240 is configured to only register a selection command that is made by a multi-modal gesture. In certain cases, the multi-modal gesture(s) can mitigate false positive selections, such as in the case where a user looks in a direction for a reason unrelated to a menu selection, or brushes/taps the audio device 10 inadvertently. Further details of multi-modal gestures and detection of such gestures is described in U.S. patent application Ser. No. 16/295,517 ("Systems and Methods for Controlling Electronic Devices"), previously incorporated by reference herein. It is further understood that in any circumstance where gestures are described as triggering action by the AR audio engine 240, multi-modal gestures can be required in order to trigger such action. This requirement can allow the user 410 to remain engaged in other audio device functions, e.g., using gestures, voice commands, etc., without accidentally initiating AR audio functions.

Additional details and examples related to the user experience in the augmented audio environment are described in the following patent applications, each of which is herein incorporated by reference in its entirety: U.S. patent application Ser. No. 16/267,643 ("Location-Based Personal Audio"); U.S. patent application Ser. No. 16/289,932 ("Augmented Audio Development"); and U.S. patent application Ser. No. 16/289,940 ("Augmented Reality Audio Playback Control").

As described herein, the AR audio engine 240 can have the technical effect of controlling spatialized AR audio output, enabling the user to engage with multiple audio inputs in a manageable and intuitive manner. The various implementations described herein allow users to engage a plurality of audio inputs, as well as external application functions without viewing a visual interface, e.g., without needing to look at a device screen. The playback, controls and/or menus described herein can be presented in a purely audio form, that is, as audio playback at transducers on an audio device 10. These approaches allow the user to receive information, perform tasks and make commands with his/her hands free and head up. That is, the user can be more aware of his/her surroundings as compared with conventional protocols that rely upon managing inputs such as audio inputs or other application inputs on a visual display or screen. As such, the AR audio engine 240 can significantly enhance the user experience when compared with these conventional protocols.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

I claim:

1. A computer-implemented method of controlling a wearable audio device, the method comprising:
adjusting a primary audio output at the wearable audio device from a first audio location to a second, distinct audio location in response to detecting an ambient acoustic signal or an additional audio input signal unrelated to the primary audio output, wherein the first audio location comprises a stereo audio output from a plurality of audio locations or spatialized audio output from a first spatially rendered audio location, and wherein the second audio location comprises spatialized audio output from a second, distinct spatially rendered audio location,
wherein the wearable audio device comprises one of: an over-ear audio device or an in-ear audio device, and in the case of detecting an ambient acoustic signal, the method further comprises enhancing the ambient acoustic signal and playing back the enhanced ambient acoustic signal at the wearable audio device to mitigate inherent passive noise canceling by the over-ear audio device or the in-ear audio device.

2. The computer-implemented method of claim 1, further comprising, while the primary audio output continues at the second audio location:
a) enabling the ambient acoustic signal to be detected by a user of the wearable audio device, or b) outputting the audio input signal at a spatially rendered audio location distinct from the second audio location.

3. The computer-implemented method of claim 1, wherein the first audio location comprises the first spatially rendered audio location, wherein the first spatially rendered audio location and the second spatially rendered audio location are two of a plurality of spatially rendered audio locations defined relative to a look direction of a user of the wearable audio device.

4. The computer-implemented method of claim 3, wherein the second spatially rendered audio location is peripheral or rearward relative to the look direction of the user, wherein the look direction of the user is indicated by sensor data from a sensor system, wherein the sensor system comprises at least one of: an inertial measurement unit (IMU) or a camera.

5. The computer-implemented method of claim 1, wherein the ambient acoustic signal comprises a voice signal from at least one of a user of the wearable audio device or a distinct user.

6. The computer-implemented method of claim 1, wherein the primary audio output comprises call audio.

7. The computer-implemented method of claim 1, wherein the second audio location is adjustable based upon at least one of: a gesture by a user of the wearable audio device, a look direction of the user, a detected direction of the ambient acoustic signal relative to the look direction of the user, or detected actuation of an interface button, and wherein the enhanced ambient acoustic signal is at a greater sound pressure level (SPL) than the ambient acoustic signal.

8. The computer-implemented method of claim 1, wherein at least one of the first audio location or the second audio location is pre-assigned based on a source of the primary audio output, and wherein each source of audio output is output as monaural playback to reduce latency.

9. A wearable audio device comprising:
a speaker comprising at least one acoustic transducer;
at least one microphone; and
a control system coupled with the speaker and the at least one microphone, the control system configured to:
   adjust a primary audio output at the at least one acoustic transducer from a first audio location to a second, distinct audio location in response to detecting: a) an ambient acoustic signal with the at least one microphone, or b) an additional audio input signal unrelated to the primary audio output, wherein the first audio location comprises a stereo audio output from a plurality of audio locations, wherein the second audio location comprises spatialized audio output from a second, distinct spatially rendered audio location, and
   wherein the control system is configured, prior to adjusting the primary audio output from the first audio location to the second audio location, to always output the primary audio at the first audio location comprising stereo audio output, regardless of a source of the primary audio output.

10. The wearable audio device of claim 9, wherein the control system is further configured, while the primary audio output continues at the second audio location, to:
a) enable the ambient acoustic signal to be detected by a user of the wearable audio device, or b) output the audio input signal at a spatially rendered audio location distinct from the second audio location.

11. The wearable audio device of claim 9, wherein the second, distinct spatially rendered audio location is peripheral or rearward relative to the look direction of the user.

12. The wearable audio device of claim 9, further comprising a sensor system coupled with the control system, the sensor system comprising at least one of: an inertial measurement unit (IMU) or a camera, wherein the look direction of the user is indicated by sensor data from the sensor system.

13. The wearable audio device of claim 9, wherein the ambient acoustic signal comprises a voice signal from at least one of a user of the wearable audio device or a distinct user, wherein the primary audio output comprises call audio.

14. The wearable audio device of claim 9, wherein the second, distinct audio location is adjustable based upon at least one of: a gesture by a user of the wearable audio device, a look direction of the user, a detected direction of the ambient acoustic signal relative to the look direction of the user, or detected actuation of an interface button at the wearable audio device.

15. The wearable audio device of claim 9, wherein the wearable audio device comprises:
a) an open-ear audio device, or
b) one of: an over-ear audio device or an in-ear audio device, wherein in the case of detecting an ambient acoustic signal, the control system is configured to enhance the ambient acoustic signal and play back the enhanced ambient acoustic signal at the at least one acoustic transducer to mitigate inherent passive noise canceling by the over-ear audio device or the in-ear audio device.

16. The wearable audio device of claim 9, wherein the control system is configured, prior to adjusting the primary audio output from the first audio location to the second audio location and in response to detecting: a) the ambient acoustic signal with the at least one microphone, or b) the additional audio input signal unrelated to the primary audio output, to:
provide an audio prompt, at the at least one acoustic transducer, at a spatialized audio location that is distinct from the first audio location; and
in response to user actuation of the audio prompt, adjusting the primary audio output to the second, distinct audio location.

17. The wearable audio device of claim 9, wherein at least one of the audio prompt or the primary audio output at the second, distinct audio location is output as band-limited playback.

18. A wearable audio device comprising:
a speaker comprising at least one acoustic transducer;
at least one microphone; and
a control system coupled with the speaker and the at least one microphone, the control system configured to:
   adjust a primary audio output at the at least one acoustic transducer from a first audio location to a second, distinct audio location in response to detecting an ambient acoustic signal, wherein the first audio location comprises a stereo audio output from a plurality of audio locations or spatialized audio output from a first spatially rendered audio location, and wherein the second audio location comprises spatialized audio output from a second, distinct spatially rendered audio location,
   wherein the second, distinct spatially rendered audio location is selected based on a detected direction of the ambient acoustic signal.

19. The wearable audio device of claim 18, wherein the second, distinct spatially rendered audio location is peripheral to or opposite to the detected direction of the ambient acoustic signal.

20. The wearable audio device of claim 19, wherein the wearable audio device comprises one of: an over-ear audio device or an in-ear audio device, and in the case of detecting the ambient acoustic signal, the control system is further configure to enhance the ambient acoustic signal and play back the enhanced ambient acoustic signal at the wearable audio device to mitigate inherent passive noise canceling by the over-ear audio device or the in-ear audio device.

* * * * *